(12) United States Patent
Kim et al.

(10) Patent No.: US 7,083,286 B2
(45) Date of Patent: Aug. 1, 2006

(54) PROJECTOR HAVING IMPROVED STRUCTURE FOR COOLING OPTICAL SYSTEM

(75) Inventors: Sru Kim, Angan (KR); Jean Hur, Seongnam (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/832,993

(22) Filed: Apr. 28, 2004

(65) Prior Publication Data

US 2005/0036115 A1    Feb. 17, 2005

(30) Foreign Application Priority Data

Aug. 11, 2003    (KR)    .................. 10-2003-0055446

(51) Int. Cl.
| | |
|---|---|
| G03B 21/16 | (2006.01) |
| G03B 21/26 | (2006.01) |
| G02F 1/1335 | (2006.01) |
| H04N 5/74 | (2006.01) |
| F21V 29/00 | (2006.01) |

(52) U.S. Cl. .................... 353/61; 353/57; 353/60; 353/31; 353/34; 349/8; 349/161; 348/748; 362/373

(58) Field of Classification Search .............. 353/61, 353/52, 57, 58, 60, 119, 33, 34, 37, 31; 362/294, 362/264, 373; 352/202; 348/748; 349/7, 349/8, 161

See application file for complete search history.

(56) References Cited

U.S. PATENT DOCUMENTS

| 6,033,077 A | * | 3/2000 | Iwase | ...................... | 353/119 |
|---|---|---|---|---|---|
| 6,132,049 A | * | 10/2000 | Yamaguchi et al. | .......... | 353/61 |
| 6,443,575 B1 | * | 9/2002 | Miyamoto et al. | ............ | 353/58 |
| 6,824,273 B1 | * | 11/2004 | Konuma et al. | .............. | 353/61 |
| 2004/0075818 A1 | * | 4/2004 | Suzuki et al. | ................. | 353/61 |
| 2004/0227901 A1 | * | 11/2004 | Kobayashi | ................... | 353/61 |

FOREIGN PATENT DOCUMENTS

| JP | 9-171353 | 6/1997 |
|---|---|---|
| JP | 10-322625 | 12/1998 |
| JP | 11-272183 | 10/1999 |
| JP | 2000-019646 | 1/2000 |
| JP | 2001-141972 | 5/2001 |
| JP | 2002-372917 | 12/2002 |
| KR | 1999-32193 | 7/1999 |
| KR | 1999-32194 | 7/1999 |
| KR | 2002-81722 | 10/2002 |
| KR | 10-2005-0017037 | 2/2005 |

* cited by examiner

*Primary Examiner*—W. B. Perkey
*Assistant Examiner*—Rochelle Blackman
(74) *Attorney, Agent, or Firm*—Staas & Halsey LLP

(57) ABSTRACT

A projector projecting an image onto a screen, comprises a lamp emitting light; an optical system having an optical synthesizer including a blue panel, a green panel and a red panel, and an optical component disposed along an optical path from the lamp to the optical synthesizer; a cooling fan generating cool air cooling the optical system; and a guiding duct guiding the cool air to be distributed into a first passage and a second passage. With this configuration, the present invention provides a projector in which a guiding duct is partitioned and therefore cool air is distributed according to whether the cool air is sent to a relatively high temperature place or a relatively low temperature place in an optical system, preventing energy from being wasted by efficiently cooling some components of the optical system without overcooling others, and reducing noise caused by a cooling fan and air flow.

13 Claims, 5 Drawing Sheets

PROJECTOR HAVING IMPROVED STRUCTURE FOR COOLING OPTICAL SYSTEM

CROSS-REFERENCE TO RELATED APPLICATIONS

This application claims the benefit of Korean Patent Application No. 2003-55446, filed Aug. 11, 2003, in the Korean Intellectual Property Office, the disclosure of which is incorporated herein by reference.

BACKGROUND OF THE INVENTION

1. Field of the Invention

The present invention relates to a projector for projecting an image onto a screen, and more particularly, to a projector having an improved structure for cooling an optical system thereof.

2. Description of the Related Art

A projector is a device generally including a light source and an optical system projecting and enlarging an image onto a screen, and is divided into two types, a CRT (Cathode Ray Tube) type and an LCD (Liquid Crystal Display) type.

The CRT-type projector (hereinafter referred to as a "CRT projector") comprises a CRT assembly projecting an image beam, a mirror reflecting the projected beam, and a screen on which the reflected beam is displayed as a picture.

The LCD-type projector (hereinafter referred to as an "LCD projector") comprises an LCD instead of the CRT assembly, wherein the image beam is adjusted in gradation by a liquid crystal and then projected and enlarged.

Such an LCD-type projector is divided into a single panel type and a triple panel type according to the number of LCD panels, and is advantageously brighter and lighter than the CRT projector.

Hereinafter, the triple-type LCD projector will be exemplarily described.

Generally, a high-power lamp is used to enhance brightness of a picture projected from the projector, and therefore a relatively large amount of heat is generated inside the projector. This heat may cause components inside the optical system to be heated and damaged. Accordingly, to manage temperature inside the projector, a forced convection cooling method using a cooling fan is employed.

As shown in FIGS. 1 and 2, a structure cooling an optical system 120 of a conventional projector comprises a duct 160 including an inlet 166 through which cool air flows in. The cooling structure also includes a plurality of outlets 167 opening toward an optical synthesizing part 130 including panels 131, 132 and 133 and target optical components 140 respectively. The cooling structure further comprises a cooling fan 150 placed inside the duct 160 that forcefully blows the cool air convectively.

The optical system 120 of the conventional projector operates as follows.

The cooling fan 150 forcefully blows the cool air, flowing in through the inlet 166 of the duct 160, to the outlets 167 and toward places where the heat is generated in the optical system 120, thereby cooling the optical system 120.

For example, some of the places where the heat is generated in the optical system 120, include the optical synthesizing part 130 including a blue panel 131, a green panel 132 and a red panel 133, and the optical components 140 including a flyeye-lens 141.

However, color signals respectively transmitted to the blue panel 131, the green panel 132 and the red panel 133 vary in wavelength, so that respective frequencies and energies thereof are different from each other. For example, the blue panel 131 which processes a blue component of the image beam receives a color signals having the shortest wavelength and the highest frequency among the color signals, and therefore, the blue panel 131 generates maximum heat as compared with other panels.

Generally, the optical system 120 is cooled with reference to a temperature of the blue panel 131 which has the highest temperature among other panels, so that the red panel 133 and the flyeye-lens 141 which have a relatively low temperature are overcooled, thereby wasting available energy.

Further, when the optical system 120 is cooled with reference to the place having a relatively high temperature, the cooling fan 150 is driven fast so as to speed up air flow, thereby causing noise due to the rotation of the cooling fan 150 and the air flow.

SUMMARY OF THE INVENTION

Accordingly, it is an aspect of the present invention to provide a projector in which a guiding duct is partitioned so that cool air is distributed according to whether the cool air is sent to a relatively high temperature place or a relatively low temperature place in an optical system, therefore preventing wasting of energy by efficiently cooling some components of the optical system without overcooling others, and reducing noise due to the rotation of a cooling fan and air flow.

The foregoing and/or other aspects of the present invention are achieved by providing a projector projecting an image onto a screen, comprising a lamp emitting light, an optical system having an optical synthesizer including a blue panel, a green panel and a red panel, and an optical component disposed along an optical path from the lamp to the optical synthesizer, a cooling fan generating cool air cooling the optical system and a guiding duct guiding the cool air to be distributed into a first passage and a second passage.

According to an aspect of the invention, the first passage of the guiding duct guides the cool air toward a place where a relatively high-temperature heat is generated in the optical system, and the second passage of the guiding duct guides the cool air toward a place where a relatively low-temperature heat is generated in the optical system.

According to an aspect of the invention, the projector further comprises a heating component which is provided outside of the optical system, wherein the cool air passing through the second passage becomes higher in temperature than the cool air passing through the first passage as the cool air passing through the second passage meets the heating component.

According to an aspect of the invention, the projector further comprises a lamp driving circuit having a power circuit and a ballast, wherein the heating component includes the ballast.

According to an aspect of the invention, the cool air passing through the first passage of the guiding duct is guided toward the blue panel, and the cool air passing through the second passage of the guiding duct is guided toward the red panel.

According to an aspect of the invention, the optical component includes a flyeye-lens, wherein the flyeye-lens is cooled by the cool air passing through the second passage of the guiding duct.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Figure 1:
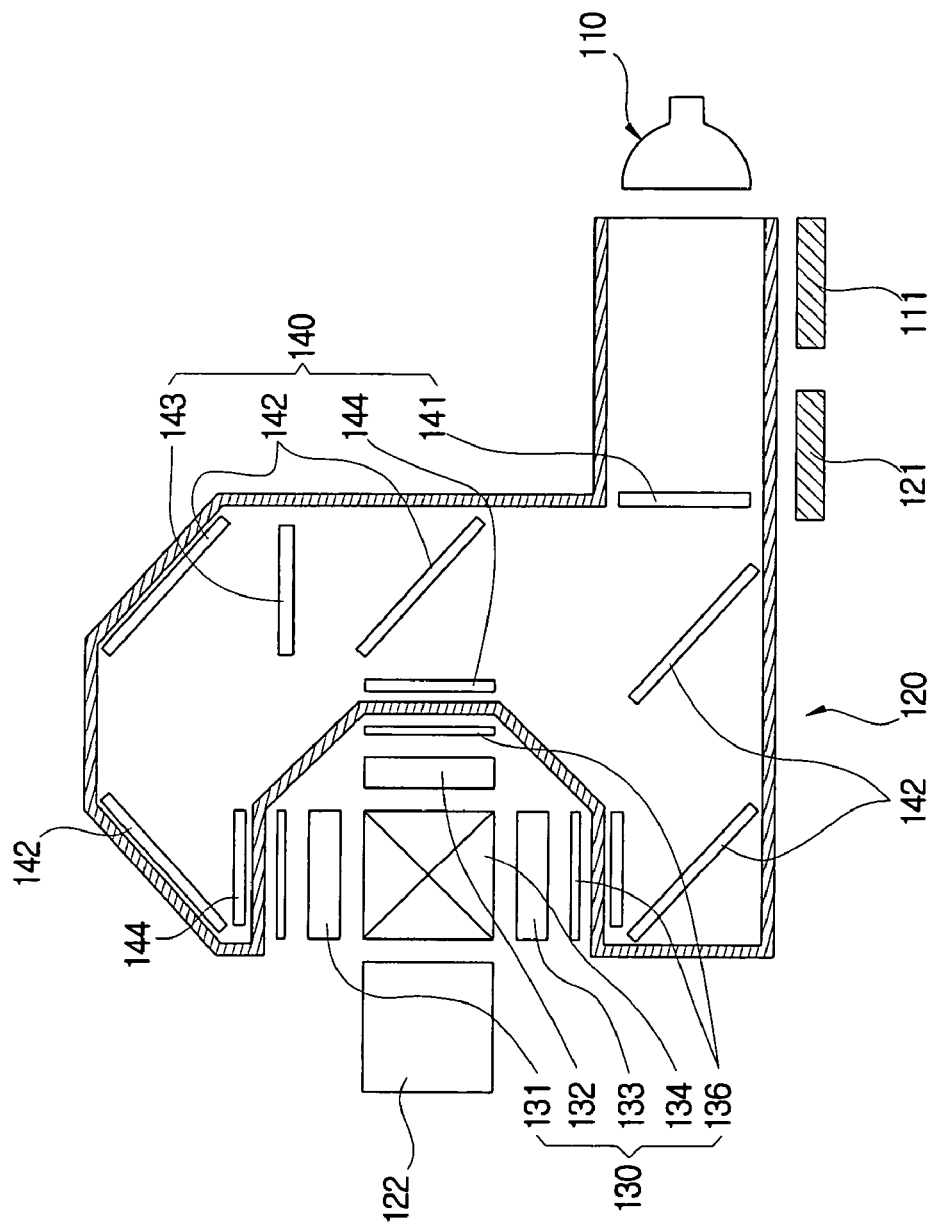
FIG. 1 is a sectional view schematically illustrating a conventional projector.
Figure 2:
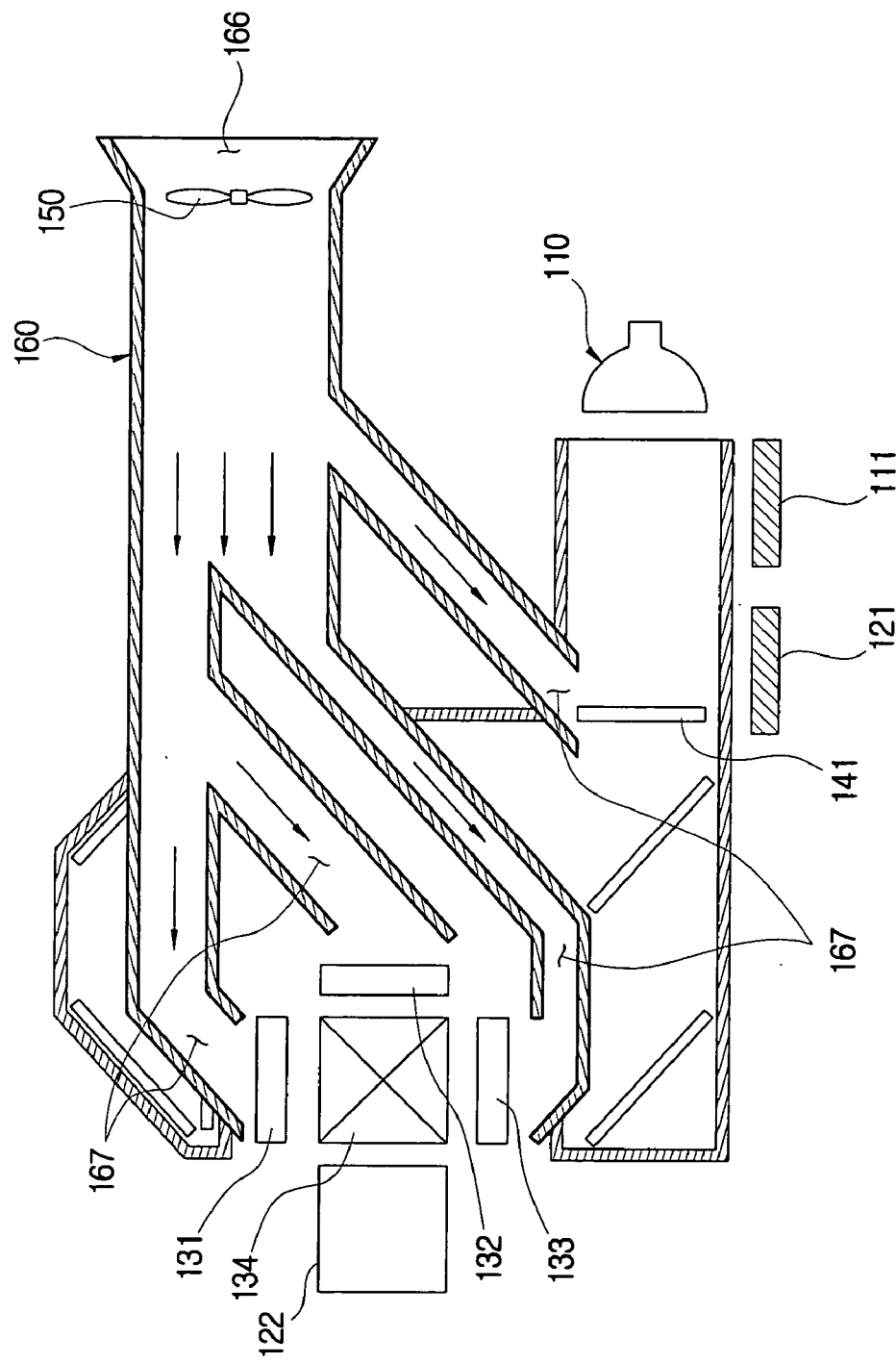
FIG. 2 is a sectional view schematically illustrating a guiding duct structure cooling an optical system of the conventional projector shown in FIG. 1.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 3:
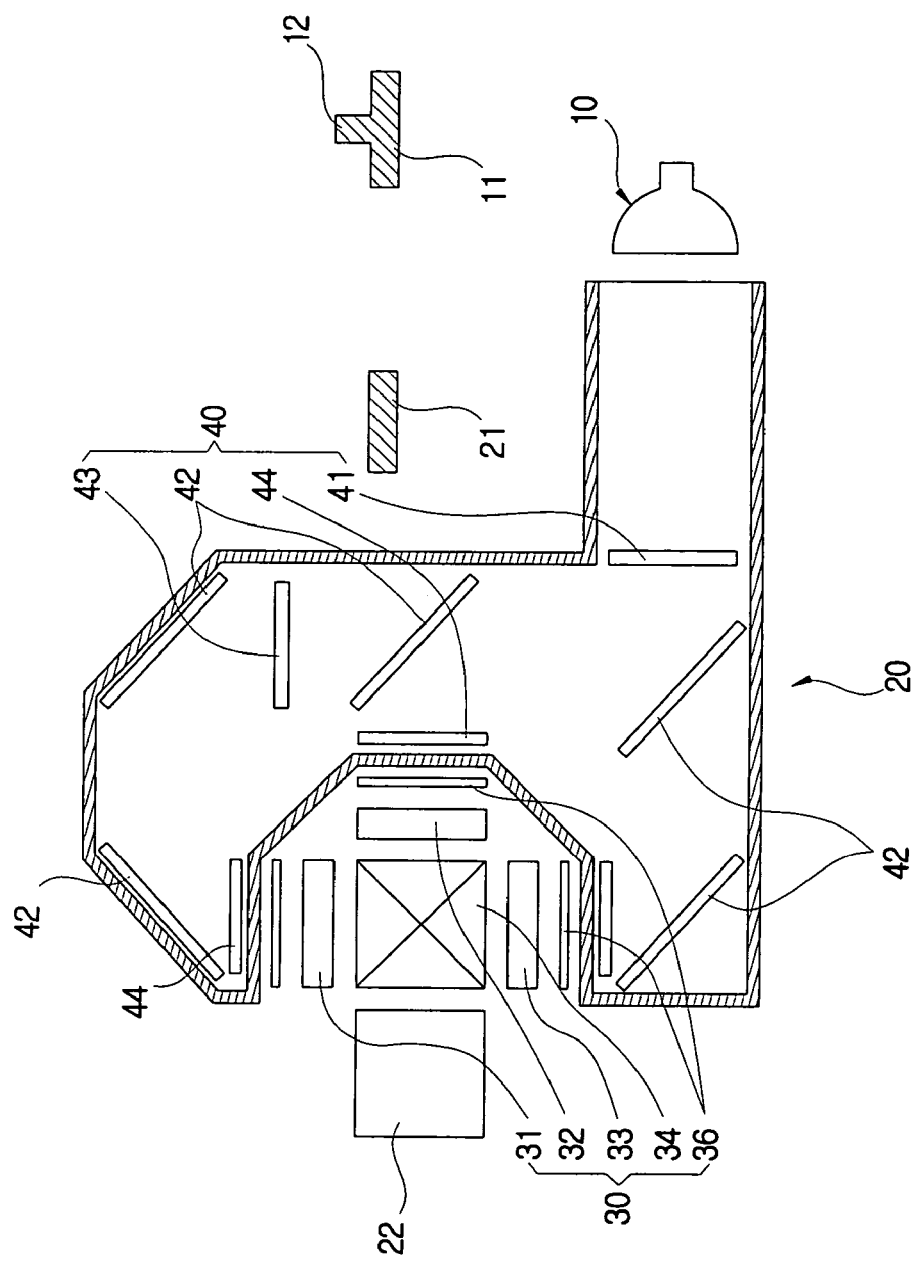
FIG. 3 is a sectional view schematically illustrating a projector according to an embodiment of the present invention.
Figure 4:
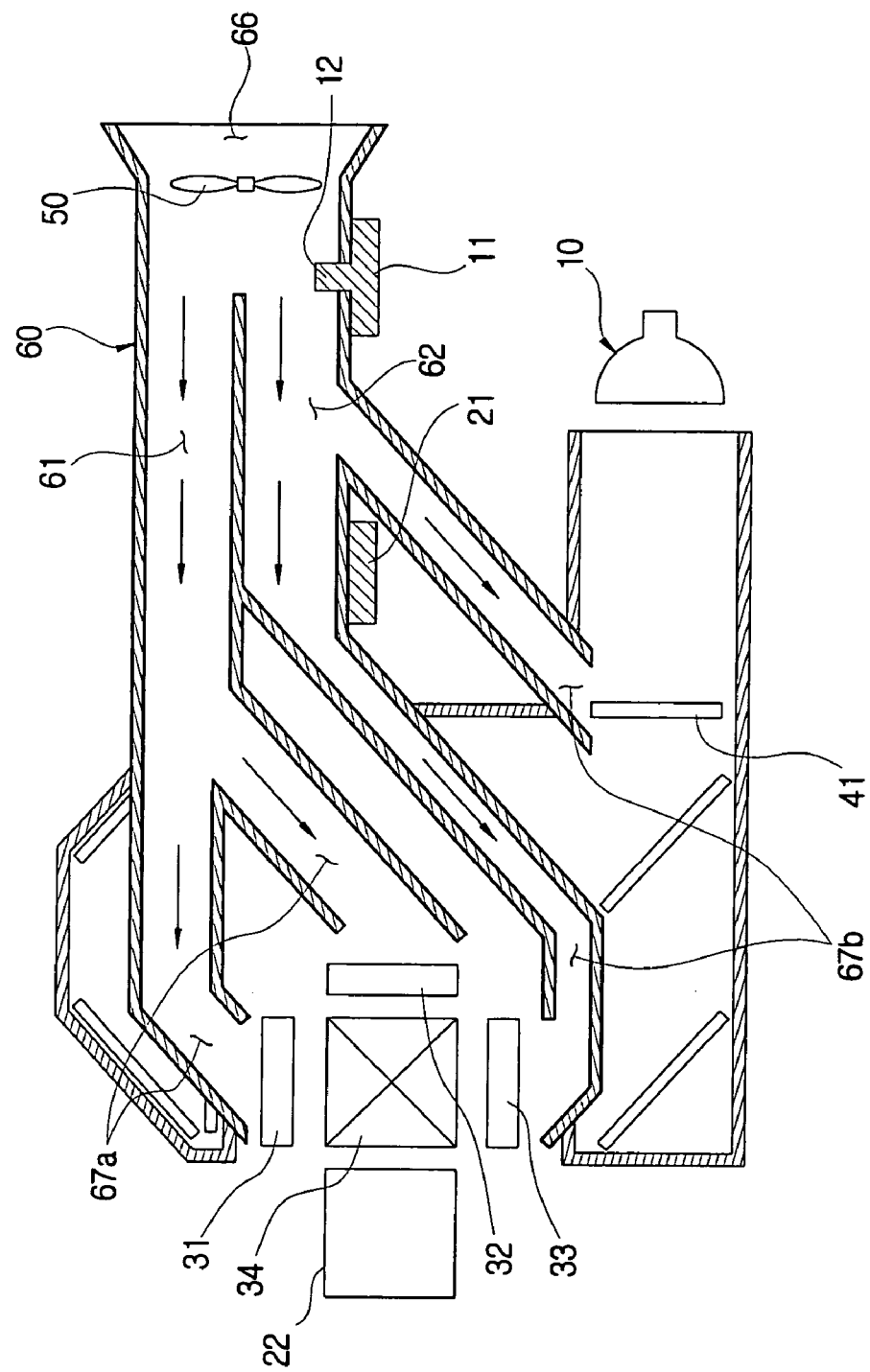
FIG. 4 is a sectional view schematically illustrating a guiding duct structure cooling an optical system of the projector shown in FIG. 1.
Figure 5:
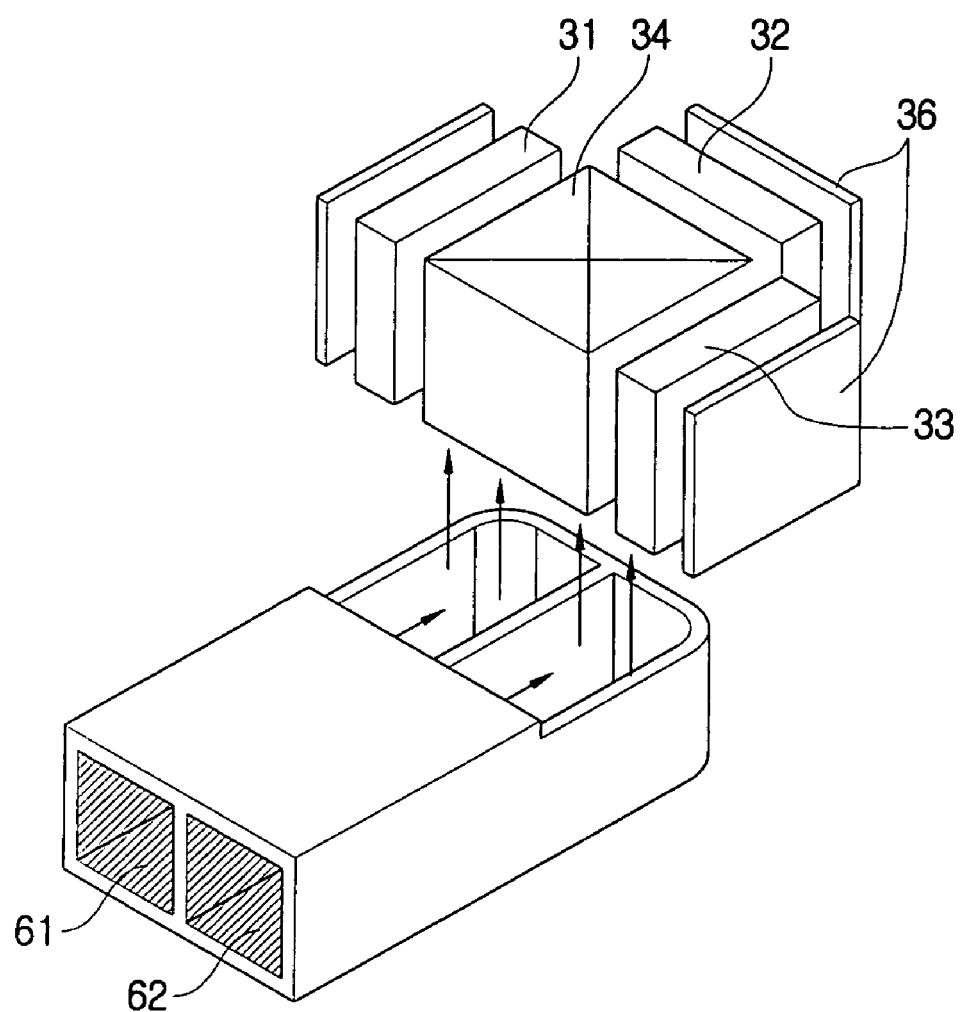
FIG. 5 is a perspective view illustrating an outlet of the guiding duct cooling an optical synthesizer of the projector shown in FIG. 1.

As shown in FIGS. 3 and 4, a projector according to an embodiment of the present invention includes a lamp 10 used as a light source, an optical synthesizer 30 synthesizing a picture, an optical system 20 including optical components 40 disposed along an optical path from the lamp 10 to the optical synthesizer 30, a printed circuit board (PCB) 21 driving the optical system 20, a lamp driving circuit 11 driving the lamp 10, a cooling fan 50 generating cool air for cooling the optical system 20, and a guiding duct 60 to guide the cool air to be distributed into a first passage 61 and a second passage 62.

The lamp 10 includes a high-power lamp such as a metal halide lamp to enhance brightness of a picture projected from the projector.

The optical synthesizer 30 includes blue, green and red panels 31, 32 and 33 to form images by adjusting optical transmissivity according to levels of a data signal, a polarizer 36 to increase the optical transmissivity of the respective panels 31, 32 and 33, and a prism 34 synthesizing the images transmitted through the respective panels 31, 32 and 33 and transmit them to a projecting lens 22. Here, while operating, the temperature of blue panel 31 is highest among components included in the optical synthesizer 30 because it processes the shortest wavelength and the highest frequency, followed by the green panel 32, and the red panel 33.

The optical components 40 include a flyeye-lens 41 through which the light is split into cells and modified into horizontal light, a total reflection mirror 42 to reflect the light transmitted through the flyeye-lens 41 toward the respective panels 31, 32 and 33, and a condensing lens 44 to condense the reflected light onto the respective panels 31, 32 and 33. Further, the optical components 40 include a relay lens 43 to prevent the light from being dispersed in the optical path from the lamp 10 to the panels 31, 32 and 33.

The flyeye-lens 41 is proximate to the lamp (light source) 10, and heats up due to the heat generated by the light source 10 which is not completely transmitted and absorbed in the flyeye-lens 41.

The PCB 21 transmits the data signal to the respective panels 31, 32 and 33 of the optical synthesizer 30, thereby driving the optical system 20 including the optical synthesizer 30.

The lamp driving circuit 11 includes a power circuit (not shown) and a ballast 12. The ballast 12 prevents current applied to the lamp 10 from becoming excessive, thus, limiting the amount of heat generated by the lamp 10.

The guiding duct 60 guides the cool air flowing in through an inlet 66 to be distributed into different internal areas of the projector. The guiding duct 60 includes at least a first and a second passage, wherein the first and second passages extend from an area near the inlet portion 60 of the projector and cooling fan 50, to an area near a mid-section of the interior of the projector, thus guiding the cool air into different interior sections of the projector. In another embodiment of the present invention, the first passage is located above the second passage, thus guiding the cool air into different interior areas of the projector.

The first passage 61 of the guiding duct 60 has a first outlet 67a opening toward a place where a relatively high-temperature heat is generated in the optical system 20.

The second passage 62 of the guiding duct 60 has a second outlet 67b opening toward a place in the optical system 20 where a relatively low-temperature heat is generated, and the cool air passing through the second passage 62 meets a heating component such as the ballast 12 separate from the optical system 20 before flowing in the second passage 62. Therefore, before flowing in the first and second passages 61 and 62 of the guiding duct 60, the cool air passing through the second passage 62 has a higher temperature than the cool air passing through the first passage 61.

The foregoing heating component is not limited to the ballast according to an embodiment of the present invention, and may include heating elements among those used in the PCB 21, for example, the lamp driving circuit 11, etc., which are not included in the optical system. Further, the PCB 21 and the lamp driving circuit 11 may be directly placed to meet the cool air passing through the second passage 62 of the guiding duct 60, so that a cooling device separately needed to cool the PCB 21 and the lamp driving circuit 11 can be simplified or eliminated.

With this configuration, the projector according to an embodiment of the present invention operates as follows.

The components included in the optical system 20 that are heated by the light emitted from the lamp 10, include the blue panel 31, the green panel 32, the red panel 33 and the flyeye-lens 41. To cool such heated components, a forced convention cooling method using the cooling fan 50 is employed.

The cool air flowing in through the inlet 66 of the guiding duct 60 is distributed into the first passage 61 and the second passage 62.

The first passage 61 of the guiding duct 60 guides the cool air toward the heated components such as the blue panel 31, which generates the relatively high-temperature heat.

The second passage 62 of the guiding duct 60 guides the cool air toward the heated components such as the red panel 33 and the flyeye-lens 41, which generate relatively low-temperature heat. The cool air passing through the second passage 62 meets and cools the heating component such as the ballast 12 separated from the optical system 20, and therefore has a higher temperature than the cool air passing through the first passage 61.

Thus, the heated components such as the red panel 33 and the flyeye-lens 41, which generate a relatively low-temperature heat, are cooled by a relatively high-temperature cool air. Therefore, even though the cooling fan 50 operates with reference to the temperature of the blue panel 31 which generates a relatively high-temperature heat, the heating components generating a relatively low-temperature heat can be efficiently cooled without being overcooled, thereby preventing wasting of available energy.

Further, there is no need to drive the cooling fan 50 too fast to speed up air flow, so that the rotation of the cooling fan 50 is properly kept, thereby decreasing noise caused by the cooling fan 50 and the air flow.

As described above, the present invention provides a projector in which a guiding duct is partitioned and therefore cool air is distributed according to whether the cool air is sent to a relatively high temperature place or a relatively low temperature place in an optical system. Therefore, the present invention prevents wasting energy by efficiently cooling some components of the optical system without overcooling others, and decreasing noise caused by a cooling fan and air flow.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A projector projecting an image onto a screen, comprising:
    a lamp emitting light;
    an optical system having an optical synthesizer including a blue panel, a green panel and a red panel, and an optical component disposed along an optical path from the lamp to the optical synthesizer;
    a cooling fan generating cool air cooling the optical system;
    a guiding duct comprising a first and a second passage, the first and second passages extending from an area proximate to an inlet portion of the projector to an area proximate to a mid-section of the projector, guiding the cool air into interior sections of the projector; and
    a heating component provided outside of the optical system,
    wherein the first passage of the guiding duct guides the cool air toward a place where a relatively high-temperature heat is generated in the optical system,
    wherein the second passage of the guiding duct guides the cool air to flow toward a place where a relatively low-temperature heat is generated in the optical system, and
    wherein the cool air passing through the second passage becomes higher in temperature than the cool air passing through the first passage as the cool air passing through the second passage meets the heating component.

2. The projector according to claim 1, further comprising a lamp driving circuit including a power circuit and a ballast.

3. The projector according to claim 1, wherein the heating component includes a ballast or a PCB.

4. The projector according to claim 2, wherein the cool air passing through the first passage of the guiding duct is guided toward the blue panel, and
    the cool air passing through the second passage of the guiding duct is guided toward the red panel.

5. The projector according to claim 1, wherein the optical component includes a fly-eye lens,
    wherein the fly-eye lens is cooled by the cool air passing through the second passage of the guiding duct.

6. A projector projecting an image onto a screen, comprising:
    a lamp emitting light;
    an optical system including an optical synthesizer and optical components disposed along an optical path from the lamp to the optical synthesizer;
    a cooling fan generating cool air cooling the optical system;
    a guiding duct including at least a first and a second passage, wherein the first and second passages extend from an area proximate to an inlet portion of the projector to an area proximate to a mid-section of the projector, and guide the cool air into interior sections of the projector; and
    a heating component provided outside of the optical system,
    wherein the first passage of the guiding duct guides the cool air toward a place where a relatively high-temperature heat is generated in the optical system,
    wherein the second passage of the guiding duct guides the cool air toward a place where a relatively low-temperature heat is generated in the optical system, and
    wherein the cool air passing through the second passage rises in temperature when the cool air contacts the heating component.

7. The projector according to claim 6, further comprising a lamp driving circuit, the lamp driving circuit including a power circuit and a ballast.

8. The projector according to claim 6, wherein the optical synthesizer includes a blue panel, a green panel and a red panel.

9. The projector according to claim 8, wherein the cool air passing through the first passage of the guiding duct is guided toward the blue panel, and
    the cool air passing through the second passage of the guiding duct is guided toward the red panel.

10. The projector according to claim 6, wherein the optical component includes a fly-eye lens,
    wherein the fly-eye lens is cooled by the cool air passing through the second passage of the guiding duct.

11. A guiding duct of a projector comprising:
    at least a first and a second passage extending from an area proximate to an inlet of the projector and cooling fan to an area proximate to a mid-section of the projector, guiding cooling air into different sections of the projector; and
    a heating component proximate to the area proximate to an inlet of the second passage,
    wherein the cooling air entering the second passage is warmed by the heating component so that the temperature of the cooling air flowing through the second passage is higher than the temperature of the cooling air flowing through the first passage.

12. A method of cooling an interior of a projector comprising:
    generating cooling air at an inlet of the projector via a cooling fan;

guiding the cooling air into the interior of the projector through a guiding duct, the guiding duct including at least a first and a second passage extending from an area proximate to an inlet of the projector to an area proximate to a mid-section of the projector;

heating cooling air entering the second passage by passing the cooling air entering the second passage near a heating component proximate to an inlet of the second passage, wherein the temperature of the cooling air flowing through the second passage is higher than the temperature of the cooling air flowing through the first passage.

13. A projector, comprising:

a lamp emitting light;

an optical system having an optical synthesizer including a blue panel, a green panel and a red panel, and an optical component disposed along an optical path from the lamp to the optical synthesizer;

a heating component;

a cooling fan generating cool air cooling the optical system; and a guiding duct comprising a first and a second passage each guiding the cool air into interior sections of the projector, wherein the cool air entering the second passage is warmed by the heating component so that cool air entering the second passage is warmer than cool air entering the first passage.

* * * * *